May 30, 1939.  G. KRAEMER ET AL  2,160,385
POWER TRANSMITTING SYSTEM
Filed March 17, 1936   6 Sheets-Sheet 1

INVENTORS.
GEORGE KRAEMER
LIONEL BERGERON
BY Moses & Nolte
ATTORNEYS.

May 30, 1939.  G. KRAEMER ET AL  2,160,385
POWER TRANSMITTING SYSTEM
Filed March 17, 1936   6 Sheets-Sheet 3

INVENTORS.
GEORGE KRAEMER
LIONEL BERGERON
BY Moses & Nolte
ATTORNEYS.

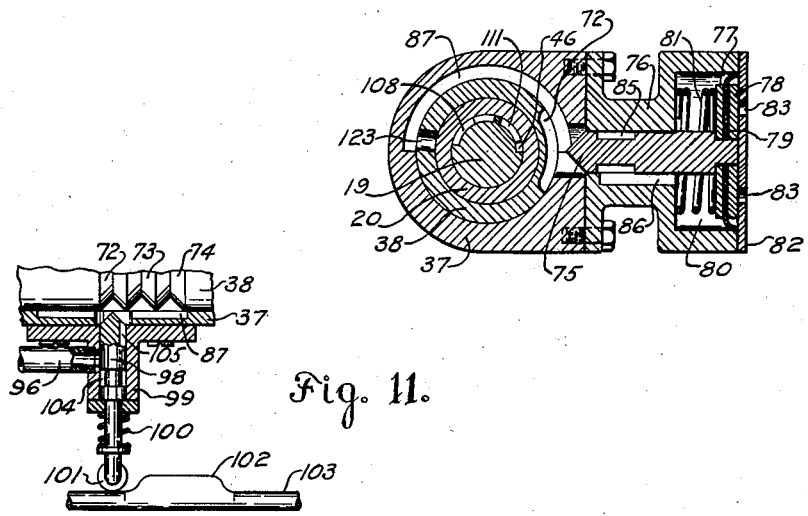

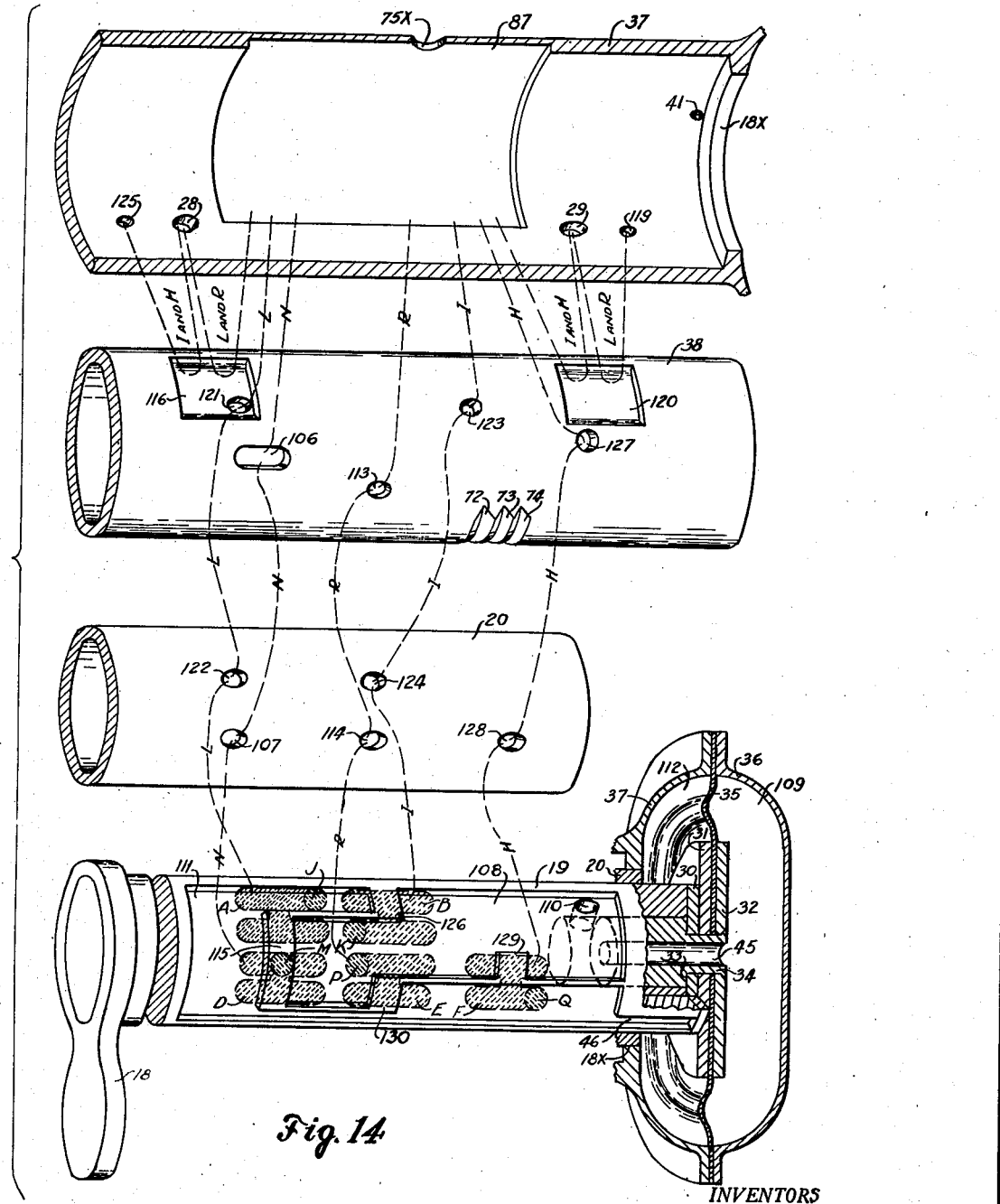

Patented May 30, 1939

2,160,385

UNITED STATES PATENT OFFICE 2,160,385

POWER TRANSMITTING SYSTEM

George Kraemer and Lionel Bergeron, Jamaica, N. Y.

Application March 17, 1936, Serial No. 69,340

4 Claims. (Cl. 74—336.5)

This invention relates to an auto-selective means for effecting changes of speed in power transmitting systems such as the transmission gearing of motor vehicles.

The principal object of the invention is to eliminate the necessity for effecting manually any forward speed transmission gear changes of an automotive vehicle, except the conventional clutch pedal manipulation, while the car is in forward motion so that it will be unnecessary for a driver to take his hand from the steering wheel for the purpose of making such changes.

Another object is to increase passenger space in the driving compartment by removing the usual gear-shifting lever from the center of the floor of said compartment.

With the foregoing and other objects in view, the invention contemplates the utilization of a conventional, or other suitable train of gears, preferably encased, and interchangeable to effect the desired changes of operating ratio between the driving and driven shafts.

In carrying the invention into effect, an object of the invention is to provide a pair of suitably positioned and separately encased vacuum-operated pistons as the chief controlling means. One of these pistons, lever-connected to suitable gear-shifting forks, and which will be termed hereinafter the primary piston is adapted to control the movements of the gear-shifting forks: the other piston, gear and lever connected to the gear-shifting forks, and which will be termed the secondary piston, is adapted to control the selective operation of the gear-shifting forks.

In further pursuance of the invention, an object is to provide for actuation of both of said pistons by a suitable fluid suction or vacuum medium such as that derived from the intake manifold and atmospheric pressure, the fluid medium making effective such energy being applied through ducts suitably connected and controlled by a series of valves disposed concentrically around the primary piston shaft.

A further object of the invention is to provide for operation of the above instrumentalities by a suitable clutch actuating lever such as the conventional foot pedal of an automotive vehicle.

Referring to the accompanying drawings in which like characters of reference designate like parts:

Fig. 1 is a view in plan of part of the transmission gearing and associated parts, in the construction of which this invention has been embodied, this figure showing in somewhat schematic fashion, connections to a driven shaft, a clutch lever and intake manifold; also means for dash-board control; portions of the outer casing being removed;

Fig. 2 is a section on the line 2—2 of Fig. 1;
Fig. 3 is a section on the line 3—3 of Fig. 2;
Fig. 4 is a section on the line 4—4 of Fig. 2;
Fig. 5 is a section on the line 5—5 of Fig. 2;
Fig. 6 is a section on the line 6—6 of Fig. 2;
Fig. 7 is a section on the line 7—7 of Fig. 2;
Fig. 8 is a section on the line 8—8 of Fig. 2;
Fig. 9 is a section on the line 9—9 of Fig. 2;
Fig. 10 is a section along the center line of the primary control valve shown in Fig. 1;

Fig. 11 is a similar section through another type of primary control valve, combined with a locking means and showing means for actuating said valve and lock motion of the clutch lever;

Figure 14 shows the main port-carrying members, isolated, to show clearly the relationship of their various ports and chambers; the piston end of the primary piston shaft is shown in section to reveal, in detail, means for connecting said shaft with the primary piston.

Figure 1:
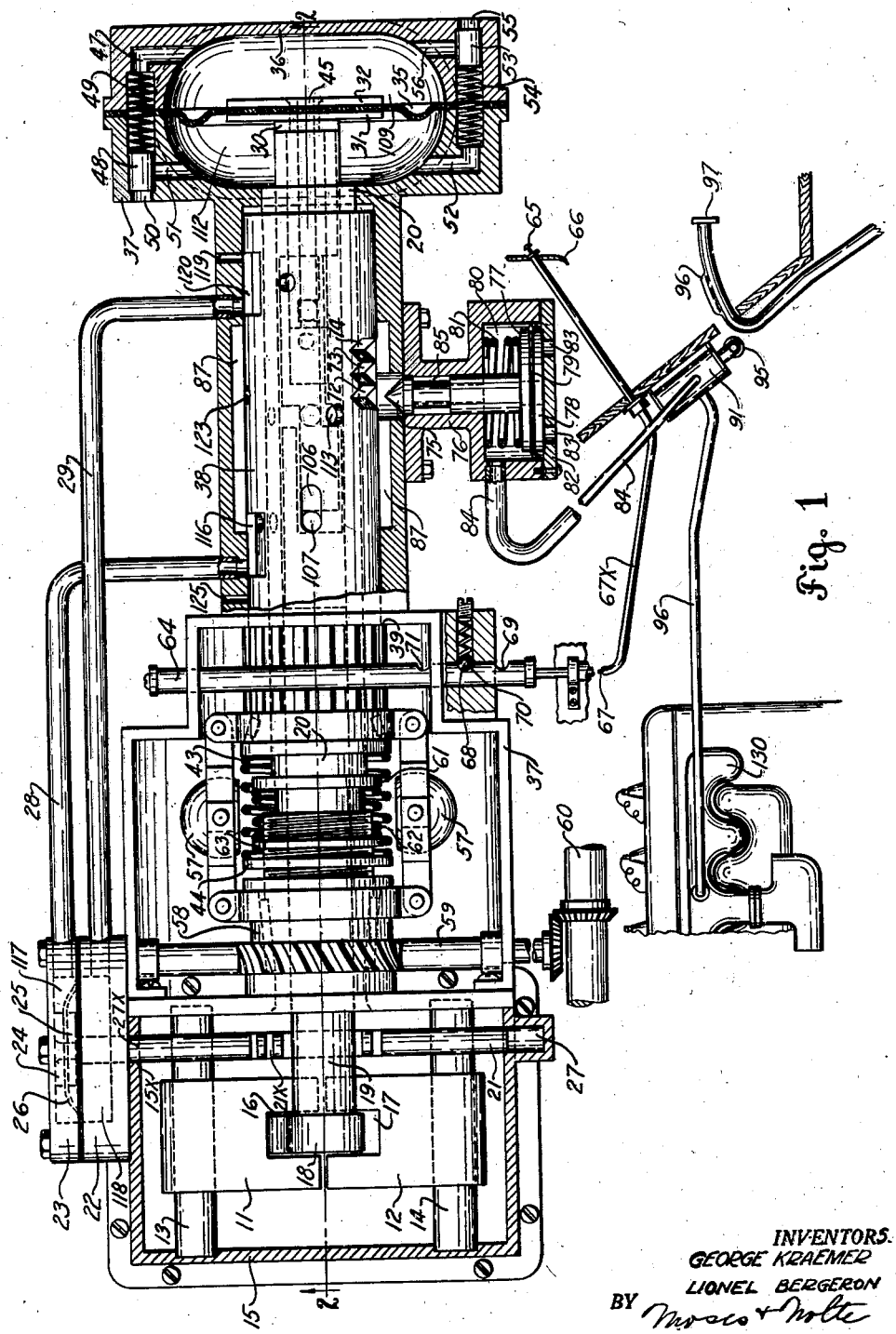
Figure 2:
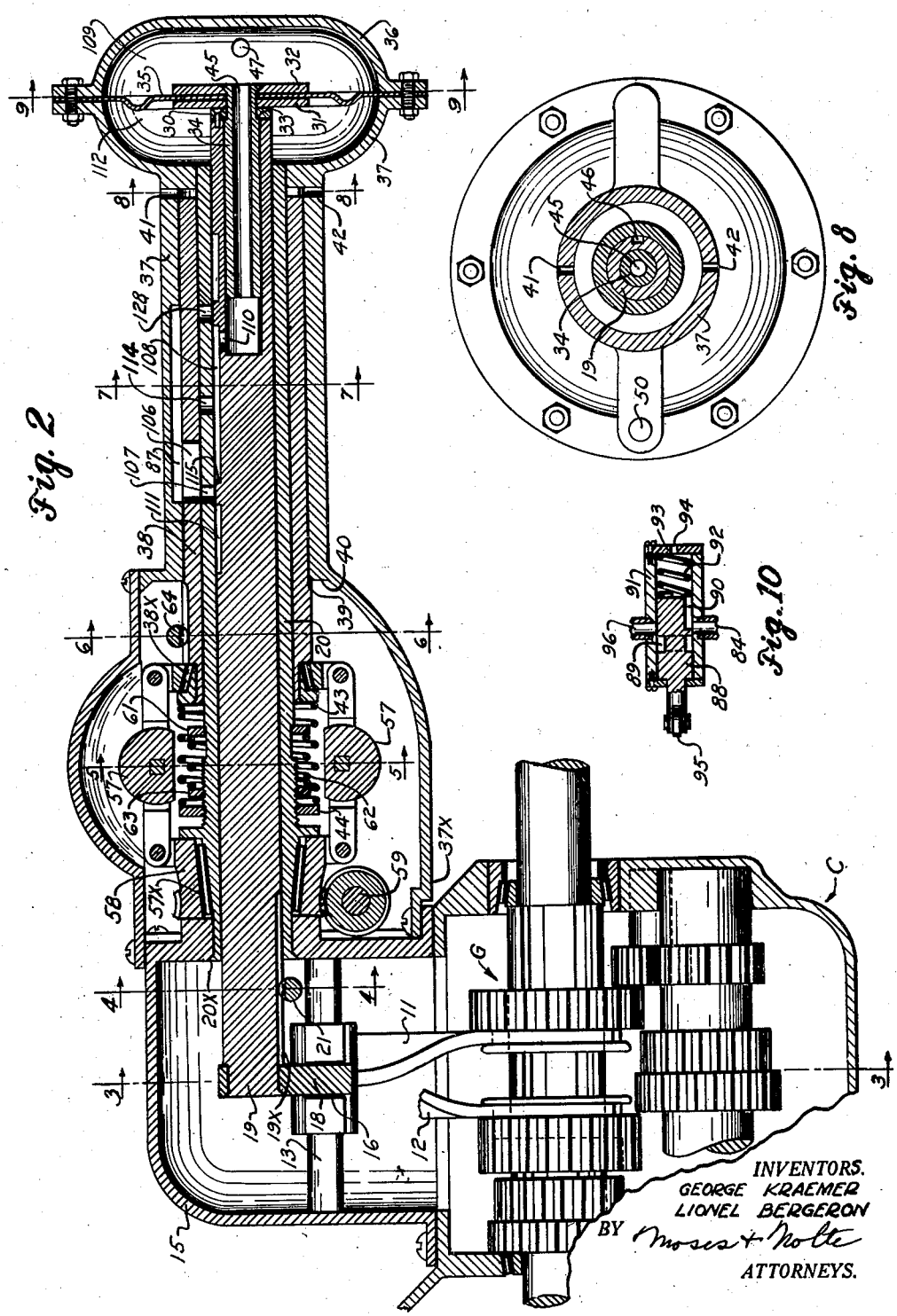
Figure 3:
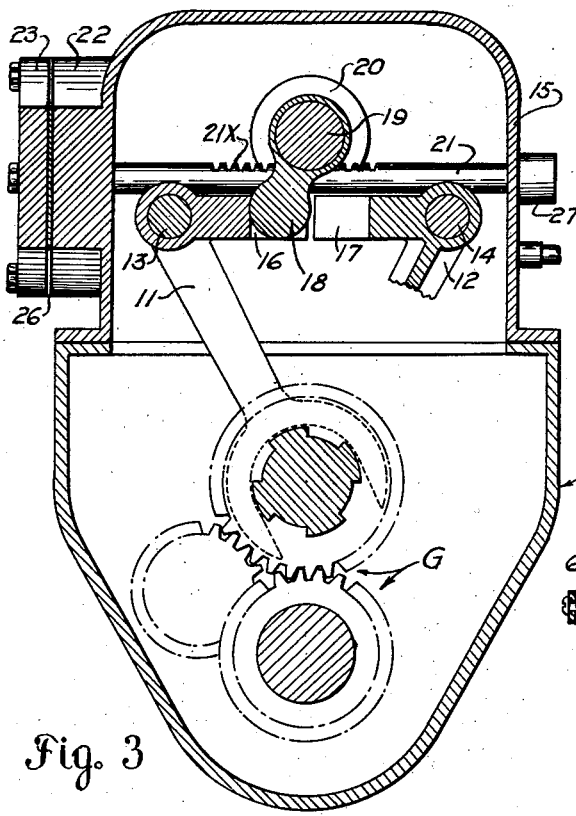
Figure 5:
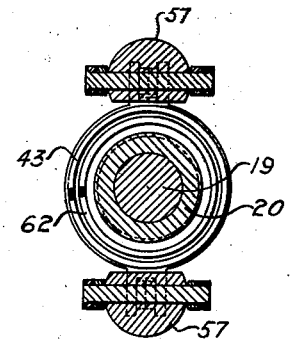

In a now-preferred embodiment of the invention, as illustrated in Figs. 1, 2 and 3, more particularly, the gears of a conventional set of transmission gearing for an automotive vehicle, the set being designated generally by the reference character G, are adapted to be moved in the usual manner by two gear-shifting forks 11 and 12, slidably mounted on rods 13 and 14 which are fixedly supported at their ends in a casing 15, the latter adapted to be fixedly mounted on the transmission casing C. The forks 11 and 12 are grooved as at 16 and 17 to receive individually a dog 18 which is in turn fixedly mounted on a shaft 19, the latter being slidably mounted within a stationary sleeve-shaft 20, and this is in turn rigidly mounted at one end as at 20X in the casing 15.

The corresponding end of shaft 19 is formed with segmental pinion teeth as 19X, in mesh with rack teeth 21X upon a piston rod 21 (see Figs. 1, 2, 3 and 4) and this rod is in turn supported telescopically at one end in a socket or recess 27 of casing 15, the other end 27X having a slip fit within, and passing through, a hole 15X in casing 15 and into secondary piston cylinder parts 22 and 23.

Fastened securely to the latter end of piston rod 21 (see Figs. 1 and 4) as by means of collars 24 and 25, is a flexible diaphragm 26. Secondary piston cylinder proper 22 is preferably an integral part of casing 15 and secondary piston cylinder cover 23 is fastened rigidly thereto. The peripheral edge of diaphragm 26 is clamped firmly between the two parts 22 and 23.

It can now be seen that the secondary piston diaphram 26 in its position shown, engages shaft 19 with gear fork 11 through dog 18 (see Figs. 1 and 3) and when said piston is moved to its opposite position, shaft 19 is rotated, and dog 18 is engaged with gear fork 12.

The fluid medium for operating said piston in said manner is transmitted through ducts 28 and 29 (see Fig. 1) and the control of said medium in ducts 28 and 29 will be set forth later. It is controlled by the position of the sleeve 38.

The other (right-hand) end of shaft 19 is fitted with a fixed collar 30, which in turn is laterally embraced between collar 31 of the primary piston and shoulder 33 of a short shaft 34 (see Fig. 2 and Fig. 14) which is in turn fitted telescopically within shaft 19, being formed with an axial duct 45, which opens at its outer end into a chamber 109 of the primary piston casing, to be described later, and is in communication at its inner end, through a port 110, with a longitudinal duct or channel 108 in the periphery of shaft 19. This construction permits shaft 19 to move rotatively independent of shaft 34 and the primary piston, but it prevents independent relative coaxial movement therebetween. Fastened securely to exposed end of a shaft 34 by means of collars 31 and 32 is a flexible diaphragm 35, the peripheral edge of which is clamped firmly between primary cylinder cover 36 and the casing 37, which is in turn fixedly mounted as at 37X on casing 15, and snugly fitted around sleeve 20 as at 18X. It can now be seen that the primary piston in its position shown, sets the gears of transmission G at neutral position. When said piston is moved in the direction of cylinder cover 36 it sets the transmission in either intermediate or reverse speed, depending on the position of the secondary piston. When the primary piston is moved to the other extreme it sets the transmission in either low or direct gear depending on position of the secondary piston. The medium for operating the primary piston is transmitted through duct 45 (see Figs. 2, 8, 9 and 14) and a duct 46 which extends along the periphery of the shaft 19, opening laterally into the chamber 112 of the primary piston casing, being of sufficient length to register at times with certain ports in the surrounding sleeve 38. The control of said medium in said ducts will be discussed later. When the medium is transmitted through duct 45 to primary piston chamber 109 the medium also enters port 47 at the outer end of the casing 37 (see Figs. 1 and 2), drawing plunger valve 48, (which is slidably fixed in casing 37) against spring 49, allowing atmospheric pressure to enter and become effective in opposite chamber 112 through ports 50 and 51. When the fluid operating medium is transmitted from its source through duct 46 to primary piston chamber 112, said medium also enters port 52, drawing plunger valve 53 (which is slidably fixed in casing 36) against spring 54 and allowing atmospheric pressure to enter and become effective in the opposite chamber 109 through ports 55 and 56.

Slidably fitted within casing 37, and around stationary shaft 20, is a sleeve valve 38. When in normal position, shoulder 39 of said sleeve valve abuts shoulder 40 of casing 37. At the right hand end of sleeve valve 38 ports 41 and 42 are provided in casing 37 to break any vacuum thus preventing lateral movement of said sleeve valve. Pressure is applied to the other end of the sleeve valve by means of a primary spring 43 which is in turn braced against a ring 44 which is in turn thread-fitted to stationary shaft 20.

Figure 12:
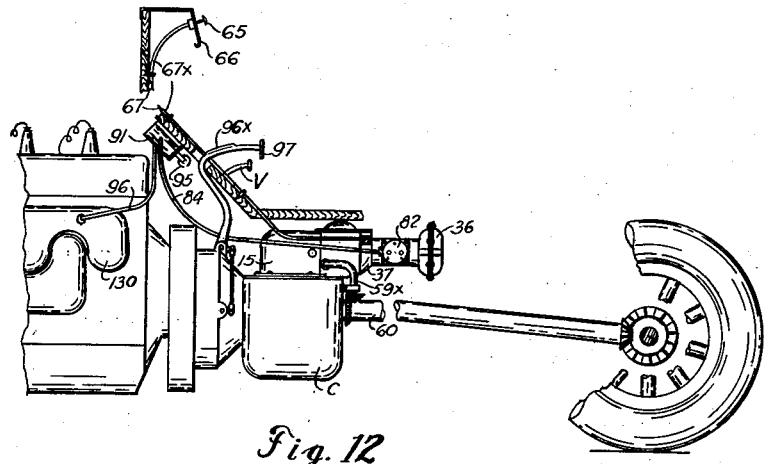
Figure 12 is an assembly view showing, in profile, the fundamental parts of a vehicle in the construction of which this invention has been embodied, this figure showing in schematic form all auxiliary connections and controls.
Figure 13:
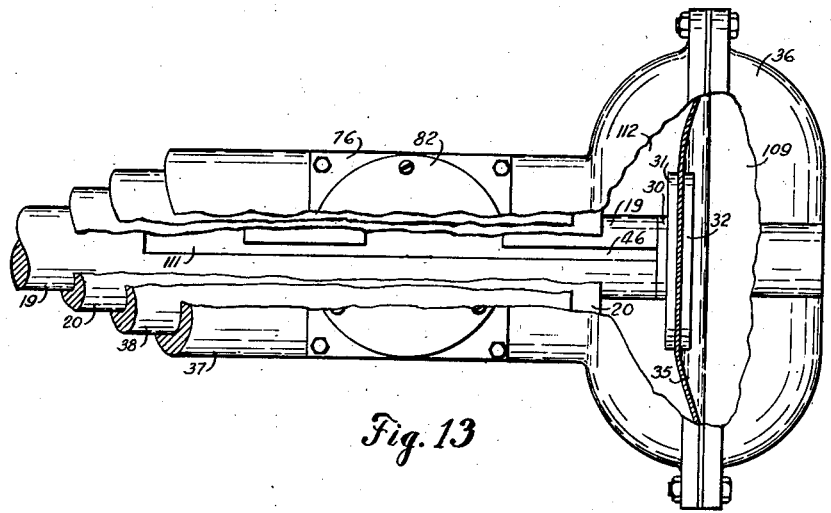
Figure 13 is a view in elevation of the primary piston casing, partly broken away to reveal the means for connecting the chambers of the primary piston casing with corresponding channels and ports in the associated parts.

Pressure of spring 43 is changed by adjustment of ring 44. This is to vary the speed at which the transmission will be changeable from low to intermediate gearing. The lateral movement of sleeve 38 against pressure of spring 43 is effected by a known type of governor 57, shown as fitted through roller bearings as 38X to the end of sleeve 38. Said governor is also shown fixed to collar 58 which is in turn fitted through bearings as 57X to stationary sleeve shaft 20. Collar 58 is geared to a shaft 59 which is driven by a driving shaft 60 (see Fig. 1) connected in any suitable manner with the transmission shaft of the vehicle (see Fig. 12). The governor accordingly revolves in direct proportion to the speed of the vehicle, and moves the sleeve 38 laterally, aligning respective ports of the sleeve 38 with ports of the casing 37 and the shaft 20 (see Fig. 14, which will be described). When the sleeve valve 38 is drawn by the governor to a position within the predetermined range between low and direct speed changes, it engages a ring 61, which is braced by a spring 62 and the latter is in turn braced by a ring 63, which is in turn thread-fitted to the stationary shaft 20. Pressure of the spring 62 is variable by adjustment of ring 63.

This is to vary the speed at which the transmission will be changeable from intermediate to direct gearing.

The sleeve-valve 38 is also geared to the shaft 64, which is manually operated by a control conveniently located, shown here as a simple push-pull trigger 65 fixed to dash panel 66 and adapted to effect control through a cable 67 in sheath 67X.

Figure 6:
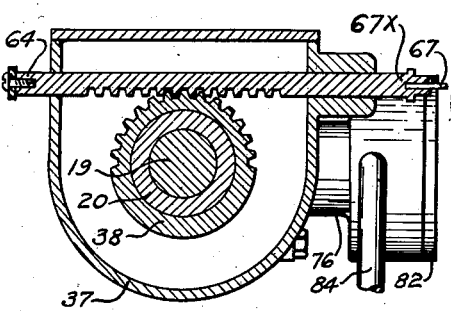
Figure 4:
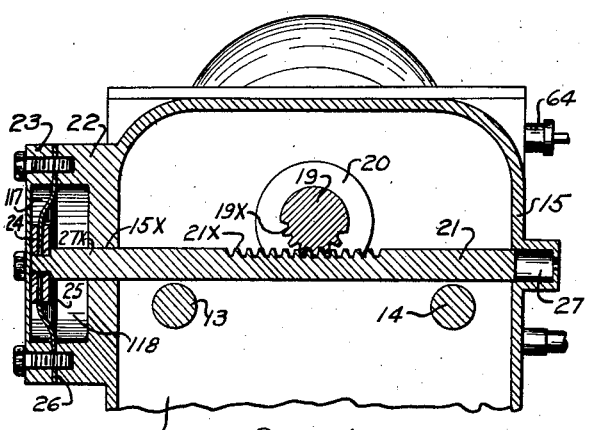

Shaft 64 has notches 69, 70 and 71, and engagement, when the rod is pushed or pulled by the above-mentioned manual control trigger 65, of notch 9 with a spring actuated lock 68, sets the sleeve valve 38 in reverse-gear-operating position, by rotating the sleeve 38 (see Fig. 6), to align the appropriate ports of the sleeve with proper ports of the casing 37 and of the shaft 20, (see Fig. 14).

In like manner, engagement of notch 70 with said lock sets sleeve valve 38 in neutral operating position as shown and engagement of notch 71 with said lock sets said sleeve-valve in position to operate the vehicle at selected forward speeds. It will be understood from the foregoing that trigger 65, through cable 67 and shaft 64 sets the sleeve valve 38 in either reverse or neutral or forward gear-operating position and, except for the conventional clutch pedal manipulation, is the only manual means for effecting any gear changes. When sleeve valve 38 is manually placed in forward gear operating position, its low, intermediate or high gear operating positions are individually and automatically determined by the governor.

In order to make positive connections between its own ports and ports of adjacent sleeves, the sleeve valve 38 has V-shaped notches 72, 73 and 74 which mesh with a vacuum actuated lock 75

(see Figs. 1 and 7). When the vehicle is moving at a rate less than predetermined intermediate gear speed, lock 75 engages notch 72. When the vehicle is traveling at a rate greater than the predetermined low gear speed, and less than the predetermined direct gear speed, the lock 75 engages notch 73.

When the vehicle is traveling at a rate greater than the predetermined intermediate gear speed, the lock 75 engages notch 74. The predetermined speed changes are variable by adjusting rings 44 and 63, which control the resistance to force of the governor.

The lock 75 consists of a shaft slideably fitted within a casing 76, which is in turn fixedly mounted on casing 37. Fixed to the end of the lock shaft 75 by means of rings 77 and 78 is a known pump-type piston 79 fitted into a chamber 80 of a suitable casing 76. The piston 79 is held in normal position by a spring 81 and chamber cover 82. Holes 83 are provided in cover 82 to prevent any vacuum from retarding the piston when in motion.

The operating fluid medium for actuating the piston 79, and atmospheric pressure to release said piston, enters chamber 80 through a duct 84. The fluid medium, in the instance described, is derived from the intake manifold 130 of the power plant through a duct 96 which is controlled by a valve 91 to be described, and by duct 84, in communication with the chamber 80. In Fig. 7 the structure of the lock-shaft 75 and the associated parts of the casing 76 are illustrated in detail. From Fig. 7 it will be seen that the lock shaft 75 is reduced in diameter at 85 to form a channel which is at all times in communication with a channel 86 leading from the chamber 80, and which is so positioned that when the shaft 75 has been set in its locking position communication is afforded between the channel 86 and a channel 87, surrounding part of the periphery of the sleeve 38. This arrangement permits the lock 75 to take an initial effect before the vacuum medium starts taking effect in the primary and secondary pistons. When the lock is engaged, passage of the fluid medium occurs from chamber 80 through passage 86 through port 75X (see Fig. 14) and into chamber 87 of casing 37. (See Fig. 7.)

Operating medium is admitted into the duct 84 only when a clutch valve 88 within the casing 91 (shown in Figs. 1 and 10) is set in operating position. Said valve consists of the valve core 88, having a passage 89 and a by-pass 90. Core 88 is slideably fitted within the casing 91 and is held in normal position by a spring 92. The cover 93 of the casing 91 is perforated as at 94 to maintain atmospheric pressure in the spring chamber at all times.

Valve core 88 is shown as actuated through a roller 95 by means of a cam 96X on clutch lever 97. The cam 96X should be of sufficient length and so positioned to retain the valve 88 in an operative position sufficiently to permit manipulation of the mechanism from any gear position to any other gear position between a full stroke position of the clutch pedal and the point where the clutch commences engagement. However, said clutch valve may be operated by any suitable means. When in normal position, as shown in Fig. 10, the clutch valve 88 permits atmospheric pressure to become effective in duct 84 through by-pass 90. As a result the lock shaft 75 will retain its normal position as shown in Fig. 7, thus permitting free movement of sleeve 38. When said valve is placed in its operative position, duct 84 is cross-connected, through passage 89, to duct 96, which is in turn connected to intake manifold 130 of the power plant.

The flow of operating medium may, therefore, be traced from the power plant through duct 96, through passage 89 of the clutch valve, through duct 84, through the passage 86. Then having effected a locking stroke of the shaft 75 which results in a communication of the passage 86 with the chamber 87 through the channel 85 whence it is distributed according to the prearranged plan of operation as set forth later (see Fig. 7).

Fig. 11 shows another type of lock combined with a clutch valve, and adapted to be manually operated. The lock shaft 98 is slideably fitted within a casing 99, which is in turn mounted on the casing 37. Said lock is held in normal position by a spring 100, being actuated through roller 101 by a cam 102 on the rod 103, which is in turn actuated by a clutch-operating lever. When said lock is engaged with a notch of the series of notches 72, 73, 74 medium is admitted into chamber 87 through passages 104 and 105 (see Fig. 11) from duct 96 which, as previously indicated, is connected to manifold 130 of the power plant.

In any case, the clutch valve is opened after the clutch has been disengaged and is permitted to close with a full stroke of the clutch lever so that the governor unit is permitted to operate freely while the clutch is fully disengaged.

Referring now to Fig. 14, this illustrates, in somewhat diagrammatic manner, the portions of the members 37, 38, 20 and 19 that contain the various ports, ducts and chambers essential to the control of the vacuum medium as it flows into the operating pistons; and also shows the relation of the ports of each member to the ports of each of the other members, by means of flow lines indicated by the letters, N, R, L, I and H, representing, neutral, reverse, low, intermediate and high gear respectively.

In Fig. 14, casing 37 is provided at its inner surface with a chamber 87, within which is a port 75X which in turn affords communication with the source of vacuum and is of sufficient area to receive, with the necessary clearance, a lock, as 75 or 98. Piercing the casing 37, are ducts 28 and 29, and relief ports 119 and 125, suitably positioned to correspond with chambers 116 and 120 of sleeve 38, in the following manner.

Sleeve 38 is provided at its outer surface with chambers 116 and 120 of sufficient areas respectively, and so positioned as to afford passage between chamber 87 and duct 28; and between ducts 29 and port 119 respectively, when sleeve 38 is in either low or reverse gear operating position. When in such position, this arrangement will permit the vacuum medium to become effective through duct 28, in chamber 117 of the secondary piston, and atmospheric pressure will be admitted into chamber 118 through duct 29, chamber 120, and relief port 119.

Chambers 116 and 120 also afford communication between duct 28 and relief port 125, and between chamber 87 and duct 29 respectively when sleeve 38 is in either intermediate or high gear position; and when in such position will permit the vacuum medium to become effective through duct 29 in chamber 118 of the secondary piston, and atmospheric pressure will be admitted into chamber 117 through duct 28, chamber 116, and relief port 125.

Piercing sleeve 38, the ports 121, 106, 113, 123 and 127 will communicate with chamber 87 when sleeve 38 is in low, neutral, reverse, intermediate and high gear operating position respectively.

On the outer surface of sleeve 38 are also provided V-shaped guides 72, 73 and 74 so positioned and of such length as to receive a locking member as 75 or 98, regardless of the limited radial position of sleeve 38. Guides 72, 73 and 74 should be so constructed as to receive said locking member when the sleeve 38 is within the predetermined low, intermediate and high gear operating ranges respectively. When, therefore, said locking member has taken full effect, the desired ports of sleeve 38, to be aligned with the proper ports of its adjacent members, will be fully effective.

Further, in Fig. 14, sleeve 20 is pierced by ports 122, 124, 107, 114 and 128 so positioned as to communicate with ports 121, 123, 106, 113 and 127 of sleeve 38, when said sleeve is in its proper gear operating position, as follows: when in low gear, 122 registers with 121, intermediate 124 with 123, neutral, 107 with 106, reverse, 114 with 113, high, 128 with 127.

Said ports of sleeves 20 and 38 will be so positioned that no other than the desired pair are in communication simultaneously.

Further, in Fig. 14, shaft 19 has impressed on its outer surface, chambers 108 and 111, shown in preferred fashion. Also in shaft 19 and within chamber 108 is a port 110 which connects chamber 108 with duct 45, and the latter in turn, runs axially and entirely through shaft 34. The fluid pressure in chamber 109 of the primary piston, is thereby always equal to the fluid pressure in chamber 108, through port 110 and duct 45.

In the outer surface of shaft 19 is formed a duct 46 running from chamber 111 to the piston end of said shaft. The fluid pressure in chamber 112 of the primary piston is thereby always equal to the fluid pressure in chamber 111, through duct 46.

Separating chambers 108 and 111 is a partition of which the parts numbered 115, 126, 130 and 129, are of sufficient area to close ports 122, 107, 124, 114 and 128, in the following manner:

Port 124 is closed by part 126, and port 128 is closed by part 129 when the dog 18 is engaged with the low-reverse gear fork 11 and when said fork is in a neutral gear position.

Port 107 is closed by partition 115 whenever both forks 11 and 12 are in a neutral gear position.

The shaded H-shaped areas A, B, D, P and F shown in Fig. 14 are those areas on shaft 19 with which are caused to register the relative ports of sleeve 20 as a result of the coaxial and radial motion of shaft 19, effected by the primary and secondary pistons.

To further elucidate, the various driving stages of a trip in a conventional vehicle, in the construction of which this invention has been embodied is now described. Certain assumptions must, however, be made. Assuming that the type of lock shown in Fig. 1 is being used, and that rings 44 and 63 have been set to effect an intermediate gear setting between the speeds of three and ten miles per hour, that the operating parts are set in a neutral position as shown in Fig. 1, and that the vehicle is at rest with the motor running. It being intended to proceed therefrom to a cruising speed range, trigger 65 is moved into a forward speed position, which thus rotates, as previously set forth, sleeve 38 to align port 121 of said sleeve with port 122 of sleeve 20, the shaft 64 being held firmly in this position by locking member 68 in notch 71. The clutch pedal 97, then depressed in the conventional manner, actuates valve 88, permitting the vacuum medium from intake manifold 130 to act on the lock piston 79, take manifold 130 to act on the lock piston 79, urging lock 75 into the guide 72; simultaneously admitting the said medium into chamber 87, thence (following lines L) through ports 121 and 122; port 122 being positioned in the center of the upper leg of area A, the medium is thus admitted into chamber 112, resulting in a half leftward stroke of the primary piston, drawing with it gear fork 11, setting the transmission in low gear. As a result of this movement of shaft 19, the port 122 will take a respective position at J. Simultaneously, said medium becomes effective through chamber 116 and duct 28, into chamber 117 of the secondary piston, holding said piston in the position shown in Fig. 1, which, because of gear teeth 19x and 21x, permits shaft 19 to move only coaxially. Releasing the clutch pedal, in the conventional manner, the vehicle is then assumedly, accelerated till a shift of gears to an advanced position is desired at which time said clutch pedal is again conventionally depressed. Assuming that at such time the vehicle were moving at a speed between the predetermined three and ten miles per hour rates, lock 75, will, in the manner described, be urged into guide 73, sleeve 38 having been advanced leftward by governor 57, thus aligning port 123, of said sleeve 38, with port 124 of sleeve 20.

Said medium will again become effective in chamber 87, thence (following lines I) through ports 123 and 124; port 124 being in position at the right end of the upper leg of area B, and the medium is admitted into chamber 109, resulting in a half rightward stroke of the primary piston, drawing with it fork 11 and setting the transmission in a neutral gear position, where port 124 is closed by part 126.

Simultaneously, the medium is made effective through chamber 120 and duct 29, in chamber 118 of the secondary piston. As a result, the shaft 19, having reached the neutral gear position just described, will be rotated by rod 21, engaging dog 18 with fork 12. Further, shaft 19, thus rotated, will reopen port 124 into chamber 108, said port 124 taking a respective position in the center of the lower leg of area B, resulting in a completion of the rightward stroke of the primary piston, drawing with it, in this latter half stroke, gear fork 12, setting the transmission in an intermediate gear position. As a result of this movement of shaft 19, the port 124 will take its proper position at K.

After again releasing said clutch pedal the vehicle is assumedly accelerated to any speed greater than the predetermined ten mile per hour rate, till such a time as it is desired to shift gears to the "high" position, at which time said clutch pedal is again conventionally depressed.

Locking member 75 will, in the manner described, be urged into guide 74, sleeve 38 having been advanced further leftward by said governor 57, thus aligning port 127 of said sleeve 38 with port 128 of sleeve 20. Said medium will again be made effective in chamber 87, thence (following lines H) through ports 127 and 128, port 128 being in position at the left end of the lower leg of area F, the medium will be made effective in chamber 111, resulting in a full leftward stroke of the primary piston, drawing with it fork 12, setting the transmission in "high" gear. As a result of this movement of shaft 19, the port 128 will take its proper position at Q. Simultaneously, the medium is made effective through chamber 120 and duct 29, in chamber 118 of the secondary piston, holding said piston in a position opposite that shown in Fig. 1, thus permitting shaft 19 to move only coaxially. Again releasing the clutch pedal, in the conventional manner, the vehicle is accelerated or decelerated as desired, and will remain in "high" until the clutch pedal is depressed when the vehicle is moving at a speed less than the predetermined ten miles per hour rate.

Assuming that the clutch pedal is next depressed when the vehicle is moving at a speed between the predetermined three and ten mile per hour rates, locking member 75 will, in the manner described, be again urged into guide 73, sleeve 38 having been retarded rightward by springs 43 and 62 thus realigning port 123 of sleeve 38 with port 124 of sleeve 20. As a result of the last-named movement of shaft 19, port 124 will have been respectively positioned at the lower right end of area B. Said medium being again transmitted along path I, as described, is thus made effective in chamber 108 resulting in a full rightward stroke of the primary piston, drawing with it fork 12, setting the transmission in an intermediate gear position. Port 124 again takes its proper position at K.

Simultaneously, the medium is made effective in the secondary piston chamber 118, through chamber 120 and duct 29, again holding said piston in a position opposite that shown in Fig. 1. After the clutch pedal is again conventionally released and assumedly depressed when the vehicle is moving at a speed less than the three mile per hour rate, lock 75, will, in the described manner be again urged into guide 72, sleeve 38 having been further retarded by spring 43, thus realigning port 121 of sleeve 38 with port 122 of sleeve 20. As a result of the last movement of shaft 19, port 122 will have been positioned at the lower left end of area A. Said medium being again made effective along path L, as described, is thus admitted into chamber 111, resulting in a half leftward stroke of the primary piston, drawing with it fork 12, setting the transmission in a neutral gear position, where port 122 is closed by part 115. Simultaneously the medium is again made effective through chamber 116 and duct 28, in chamber 117 of the secondary piston. As a result, the shaft 19 having reached the neutral gear position, just described, will be rotated by rod 21, engaging dog 18 with fork 11. Further, the shaft 19, thus rotated, will again open port 122 into chamber 111, said port 122 taking a suitable position in the center of the upper leg of area A, resulting in a completion of the leftward stroke of the primary piston, drawing with it the fork 11 in this latter half stroke, setting the transmission in low gear position.

As a result of this final movement of shaft 19, the port 122 will take its position at J. Forward acceleration of the vehicle is attained by releasing the clutch in the conventional manner.

A change of gears directly from "low" to "high" is possible if after the transmission having been set in "low", the clutch pedal is depressed only when the predetermined ten mile per hour rate has been exceeded.

From the foregoing, it will be seen that when the clutch pedal is depressed, port 128, now positioned in the upper right end of area F, will communicate with chamber 108. As a result the primary piston will draw fork 11 to a neutral position where port 128 will be closed by partition 129, at which point shaft 19 will be rotated by the secondary piston, opening port 128 into chamber 111, and engaging dog 18 with fork 12. As a result, the primary piston will move back again to the left, drawing with it fork 12, setting the transmission in "high".

Likewise a change of gears directly from "high" to "low" is possible if after the transmission having been set in "high", the clutch pedal is depressed, only when the speed of the vehicle has decreased below the predetermined three miles per hour rate.

It will be seen further that when the clutch pedal is depressed, port 122, now positioned in the lower right end of area A, will communicate with chamber 108. As a result the primary piston will draw fork 12 to a neutral position where port 122 will be closed by partition 115, at which point shaft 19 will be rotated by the secondary piston, opening port 122 into chamber 111 and engaging dog 18 with fork 11. As a result the primary piston will move back again to the left drawing with it fork 11, setting the transmission in "low".

The transmission may be set in a neutral gear position directly from any other position by setting the trigger 65 in the "neutral" position, which causes, as previously described, the sleeve 38 to rotate and to align port 106 of said sleeve with port 107 of sleeve 20, shaft 64 being held firmly in this position by lock 68 in notch 70. The clutch pedal, when depressed in the conventional manner, makes the medium, as previously described, effective in chamber 87; thence (following lines N) through ports 106 and 107. Had the transmission been previously set in "low", port 107 would be respectively positioned at the upper right end of area D and in communication with chamber 108, resulting in a half rightward stroke of the primary piston, drawing with it fork 11 to a neutral position and port 107 taking a corresponding position at M, thus being closed by partition 115. Had the transmission been previously set in "high", port 107 would be respectively positioned at the lower right end of area D and in communication with chamber 108, resulting in a half rightward stroke of the primary piston, drawing with it fork 12 to a neutral position, port 107 taking a respective position at the center of the lower leg of area A, thus being closed by partition 115.

Had the transmission been previously set in "reverse", port 107 would be consequently positioned at the upper left end of area D and in communication with chamber 111, resulting in a half leftward stroke of the primary piston, drawing with it fork 11 to a neutral position, port 107 taking a position at M, thus being closed by partition 115.

Had the transmission been previously set in "intermediate", port 107 would be respectively positioned at the lower left end of area D and in communication with chamber 111, resulting in a half leftward stroke of the primary piston, drawing with it fork 12 to the neutral position, port 107 taking a corresponding position at the center of the lower leg of area D thus being closed by partition 115.

The transmission may be set in "reverse" only from a "low" or "neutral" position, when the vehicle is moving forward at a speed less than the predetermined three mile per hour rate, by setting trigger 65 in the "reverse" position, which as previously described, causes rotation of sleeve 38 to align port 113 of said sleeve with port 114 of sleeve 20, shaft 64 being held firmly in this position by the locking member 68 in notch 69. The clutch pedal, when depressed in the conventional manner, makes the medium, as previously described, effective in chamber 87, thence (following lines R) through ports 113 and 114. Had the transmission been previously set in "low", port 114 would be correspondingly positioned at the upper right end of area E and in communicaiton with chamber 108, resulting in a full rightward stroke of the primary piston, drawing with it fork 11 to the "reverse" position, port 114 taking its position at P. Simultaneously, the medium is made effective through chamber 116 and duct 28, in chamber 117 of the secondary piston, holding said piston in the position shown in Fig. 1, thus permitting shaft 19 to move only coaxially.

Had the transmission been previously set in "neutral", port 114 would be positioned at the center of the upper leg of area E and in communication with chamber 108, resulting in a half rightward stroke of the primary piston, drawing with it fork 11 to the "reverse" position and port 114 taking a corresponding position at P. Simultaneously, the medium is also made effective, through chamber 116 and duct 28, in chamber 117 of the secondary piston, holding said piston in the position shown in Fig. 1.

We claim:

1. An auto-selective transmission control for a gear transmission of the class comprising driving and driven rotary members, a suitable train of gears adapted to be variably coupled to effect changes of operating ratio between said driving and driven rotary members; means operable to couple said gears progressively or retrogressively for the stated purpose; said transmission control being characterized by a pair of encased suction fluid operable pistons, connections by which said pistons are adapted to actuate said coupling means, a system of ducts connected with said piston casings, a source of suction, means connected to said source of suction and to said ducts, a governor, governor controlled valve means for effecting automatic control of movements in said system for actuation of said pistons by exclusively suction-initiated impulses in response to the speed of said driven member, to determine changes in the gear coupling independently of manual intervention within said system, a further piston device, a locking means operated thereby to lock a governor controlled element of said gear coupling selecting means against operation by the governor during gear coupling operations, and manually operable means to set said transmission control to determine through the transmission gears the direction of movement of said driven member.

2. An auto-selective gear transmission including, in combination, transmission gears, a pair of encased pistons adapted to be operated by fluid pressure, a system of ducts for transmitting suction to and from said encased pistons, means providing a source of suction for utilization in said system, valves to control the suction transmission, gear shifting forks adapted to serve in part as controlling means for the gears, a shaft having a movement of rotation controlled by one of said pistons, and a dog operated by the said shaft when rotated to select a predetermined one of said forks, another of said pistons being operable to vary the axial position of said shaft, thereby to effect shift to the selected gear, all selective and shifting movements being made effective through said shaft, and said suction controlling valves including a plurality of relatively adjustable sleeves coaxially disposed around said shaft.

3. An auto-selective gear transmission including, in combination, transmission gears, a pair of encased pistons adapted to be operated by fluid pressure, a system of ducts for transmitting suction to and from said encased pistons, means providing a source of suction for utilization in said system, valves to control the suction transmission, gear shifting forks adapted to serve in part as controlling means for the gears, a shaft having a movement of rotation controlled by one of said pistons, and a dog operated by the said shaft when rotated to select a predetermined one of said forks, another of said pistons being operable to vary the axial position of said shaft, thereby to effect shift to the selected gear, and manually operable means for initiating the action of said pistons, all selective and shifting movements being made effective through said shaft, and said suction controlling valves including a plurality of relatively adjustable sleeves coaxially disposed around said shaft.

4. An auto-selective gear transmission including, in combination, transmission gears, a pair of encased pistons adapted to be operated by fluid pressure, a system of ducts for transmitting suction to and from said encased pistons, means providing a source of suction for utilization in said system, valves to control the suction transmission, gear shifting forks adapted to serve in part as controlling means for the gears, a shaft having a movement of rotation controlled by one of said pistons, and a dog operated by the said shaft when rotated to select a predetermined one of said forks, another of said pistons being operable to vary the axial position of said shaft, thereby to effect shift to the selected gear, all selective and shifting movements being made effective through said shaft, and said suction controlling valves including a plurality of relatively adjustable sleeves coaxially disposed around said shaft, one of said sleeve valves being adapted by its rotative setting to determine whether the coupling shall be for forward or reverse drive, and a push-pull, hand-actuated device to operate said sleeve rotatively.

GEORGE KRAEMER.
LIONEL BERGERON.